(12) United States Patent
Lee

(10) Patent No.: US 6,533,979 B1
(45) Date of Patent: Mar. 18, 2003

(54) METHOD FOR MANUFACTURING PATTERN-THROUGH SOAP

(76) Inventor: Kuo-Hsiung Lee, No. 9, Lane 46, Mo-Fan St., Taichung (TW)

(*) Notice: Subject to any disclaimer, the term of this patent is extended or adjusted under 35 U.S.C. 154(b) by 319 days.

(21) Appl. No.: 09/610,692

(22) Filed: Jul. 7, 2000

(51) Int. Cl.⁷ .............................................. B29C 47/00
(52) U.S. Cl. ............ 264/148; 264/173.12; 264/173.18; 264/177.11
(58) Field of Search ...................... 264/148, 75, 173.12, 264/173.15, 173.18, 177.11, 320; 425/131.1

(56) References Cited

U.S. PATENT DOCUMENTS

| | | | | |
|---|---|---|---|---|
| 3,884,605 A | * | 5/1975 | Grelon .......................... | 264/245 |
| 3,899,566 A | * | 8/1975 | Murray ......................... | 264/245 |
| 3,923,438 A | * | 12/1975 | Perla ............................ | 264/245 |
| 4,127,372 A | * | 11/1978 | Perla et al. ................. | 264/171.1 |
| 4,196,163 A | * | 4/1980 | Finkensiep et al. .......... | 264/148 |
| 4,201,743 A | * | 5/1980 | Perla et al. ................... | 264/148 |
| 4,304,745 A | * | 12/1981 | Alderson et al. .......... | 264/171.1 |
| 4,310,479 A | * | 1/1982 | Ooms et al. ................. | 264/101 |
| 4,459,094 A | * | 7/1984 | Sanabria ..................... | 264/245 |
| 4,802,835 A | * | 2/1989 | Silvis et al. ............. | 264/211.11 |

* cited by examiner

*Primary Examiner*—Mark Eashoo
(74) *Attorney, Agent, or Firm*—Bacon & Thomas

(57) ABSTRACT

A method for manufacturing a pattern-through soap is disclosed, in which a pattern block is embedded into a soap and penetrates through the two faces of the soap. After the soap is used for a long time, the pattern remains clear. The method for embedding the pattern block in the soap is: feeding materials from a primary tube and a secondary tube; a flow dividing mold is installed at the bottom of the secondary tube and a dispatching tube is connected to the primary tube. The soap material of the secondary tube firstly flows through the mold at the bottom of the flow dividing mold and is squeezed to be formed as a strip shape soap material. Then, the soap material of the primary tube flows through the outer side of the flow dividing mold to enclose the patterned soap material. Then, the soap material is sent out from the shaping mold at the outlet of the mixing tube so as to be formed with a strip shape soap. Then, the soap can be cut according to the desired thickness. Therefore, a method for manufacturing a pattern-through soap is formed.

3 Claims, 5 Drawing Sheets

METHOD FOR MANUFACTURING PATTERN-THROUGH SOAP

FIELD OF THE INVENTION

The present invention relates to a method for manufacturing a pattern-through soap, in which two feeding tubes are used for manufacturing a pattern block and a soap which are combined by a flow dividing mold so that the pattern in the soap remains clear after being used for a long time.

BACKGROUND OF THE INVENTION

In the prior art, after a soap 10 is formed, engraved with patterns by a mold and then punched by a punching machine so that the soap 10 contains desired patterns 101 at the two faces (see FIG. 1). Therefore, an advertisement effect is achieved. However, the pattern 101 is confined by the pressure and the reaction of the soap 10, and it has only a depth of 0.3 to 0.5 cm. Therefore, as the soap 10 is used for a period of time the depth of the pattern 101 will become shallow due to the wearing of the soap, even for a longer time, the pattern 101 will disappear and the advertisement effect is lost. This generally occurs to the manufacturer of soaps. Therefore, there is a pressing demand for a method for manufacturing a pattern-through soap which can improve the defects in the prior art design so as to increase the advertisement effect of the product.

SUMMARY OF THE INVENTION

Accordingly, the primary object of the present invention is to provide a method for manufacturing a pattern-through soap, in which a pattern block is embedded into a soap and penetrates through the two faces of the soap. After the soap is used for a long time, the pattern remains clearly visible. The method for embedding the pattern block in the soap is: Feeding materials from a primary tube and a secondary tube; a flow dividing mold is installed at the bottom of the secondary tube and a dispatching tube is connected to the primary tube. The soap material of the secondary tube firstly flows through the mold at the bottom of the flow dividing mold and is squeezed to be formed as a strip shape soap material. Then, the soap material of the primary tube flows through the outer side of the flow dividing mold to enclose the patterned soap material. Then, the soap material is sent out from the shaping mold at the outlet of the mixing tube so as to be formed with a strip shape soap. Then, the soap can be cut according to the desired thickness. Therefore, a method for manufacturing a pattern-through soap is described.

The various objects and advantages of the present invention will be more readily understood from the following detailed description when read in conjunction with the appended drawing.

DETAILED DESCRIPTION OF THE PREFERRED EMBODIMENTS

Figure 1:
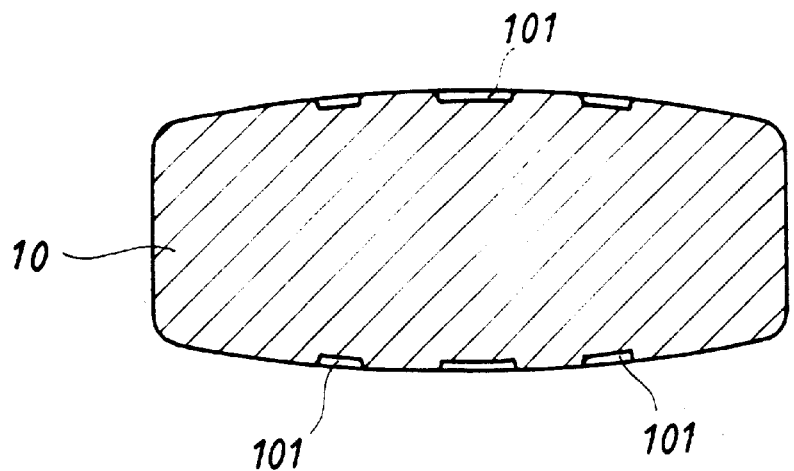
FIG. 1 is a cross sectional view of the prior art soap with a printed pattern.
Figure 2:
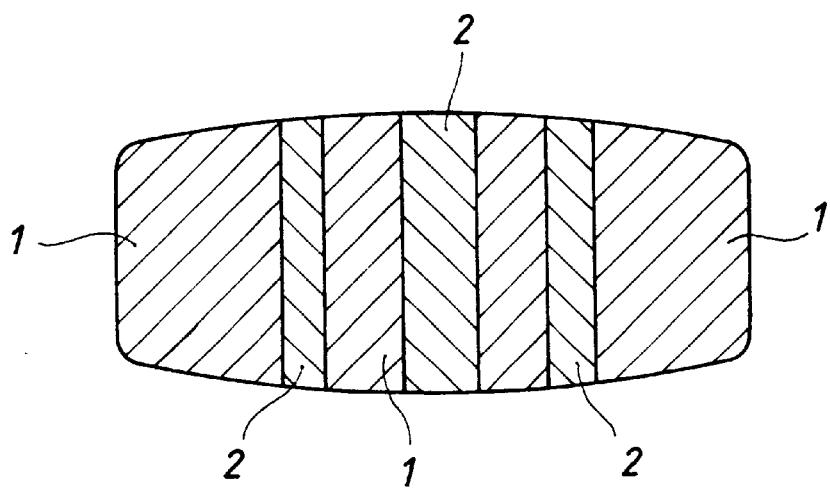
FIG. 2 is a schematic cross sectional view of the soap according to the present invention.
Figure 3:
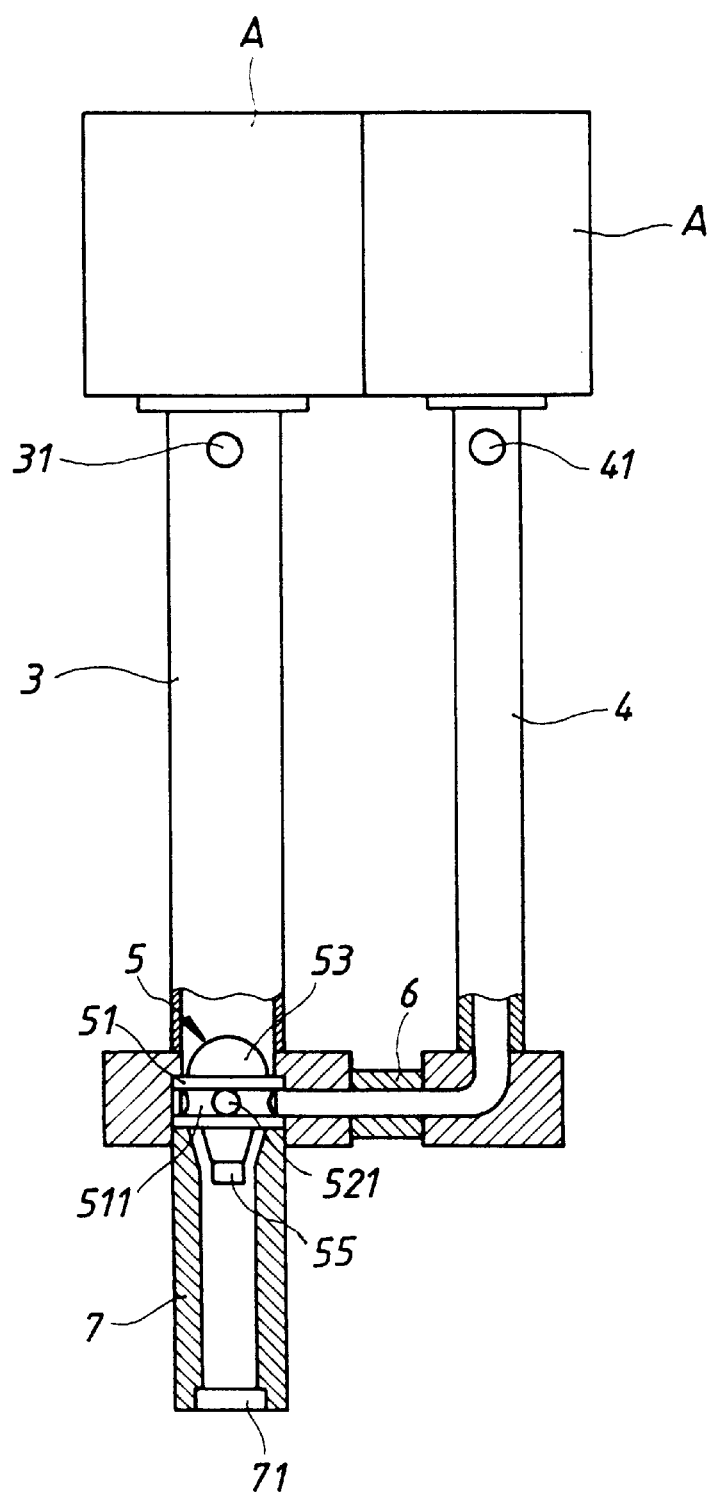
FIG. 3 is a schematic view showing the arrangement of the soap shaping machine used in the present invention.

Referring to the appended figures, the method for manufacturing a pattern-through soap of the present invention is illustrated. The soap in the present invention is formed by a soap body 1 and a pattern block 2 penetrating the soap body 1 (as shown in FIG. 2). The pattern block 2 is embedded into the soap body 1 and penetrates through the two faces of the soap body 1. The soap shaping machine (see FIG. 3) has a primary tube 3 and a secondary tube 4. The distal end of the primary tube 3 is assembled with a flow dividing mold 5, and the distal end of the secondary tube 4 is connected with a dispatching tube 6. The distal end of the flow dividing mold 5 is connected with a mixing tube 7.

The primary tube 3 and secondary tube 4 are connected to the output ends of the gear A. Each tube is installed with a feeding tube (not shown, it is a prior art structure), and the front end thereof is connected with a filling opening 31, 41.

Figure 4:
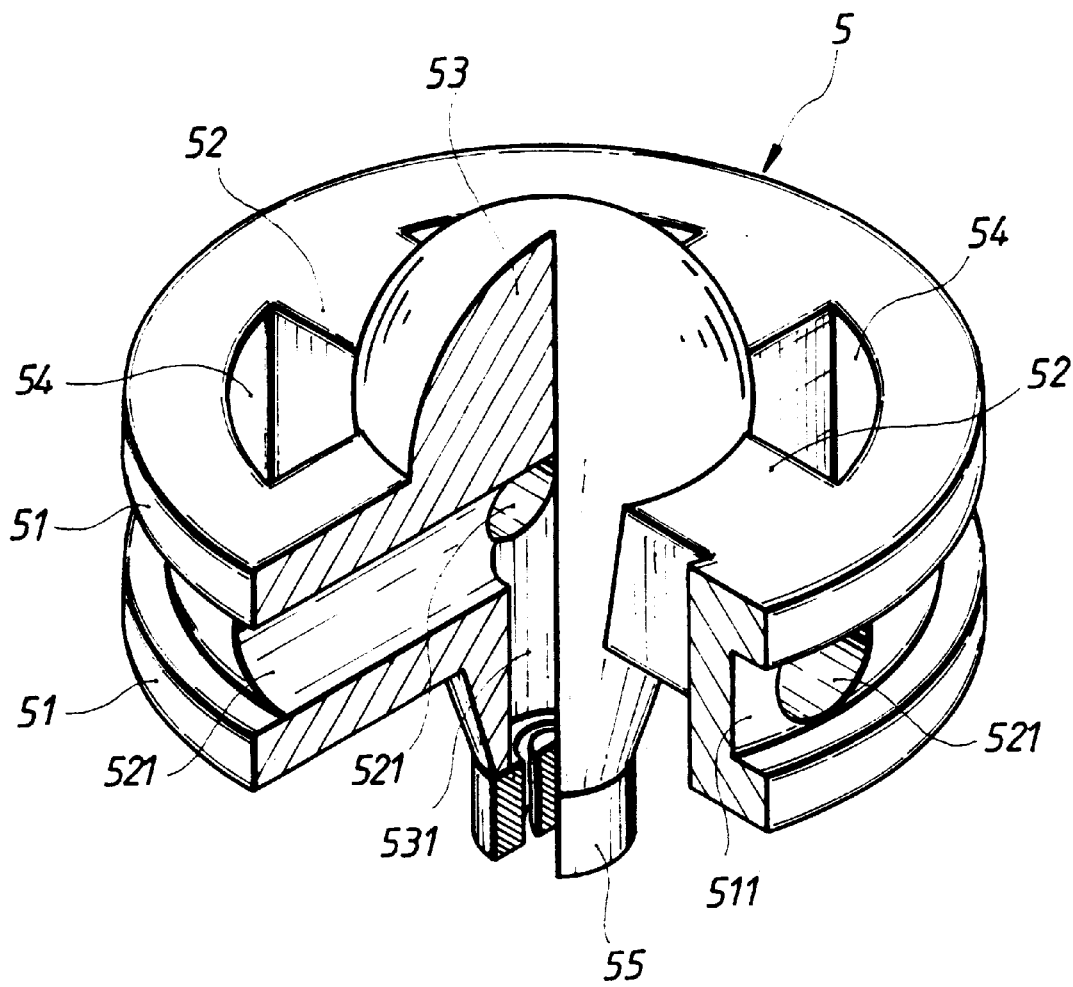
FIG. 4 is a schematic cross sectional view of the secondary tube used in the present invention.
Figure 5:
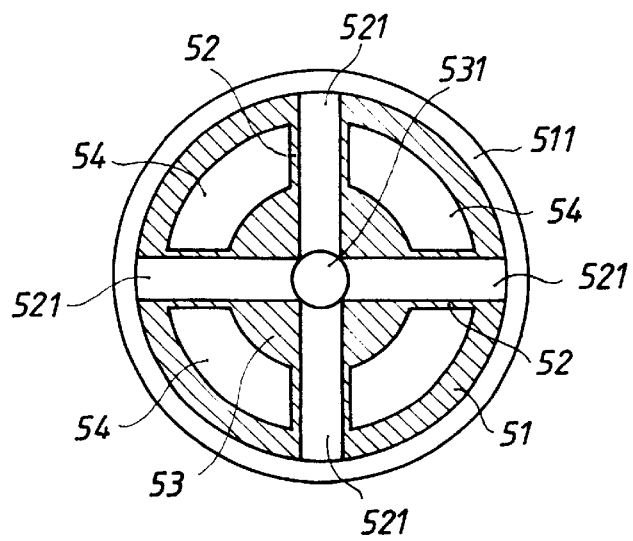
FIG. 5 is a transversal schematic cross sectional view of the flow dividing mold in the present invention.

The flow dividing mold 5, as shown in FIGS. 4 and 5, is an annular ring 51, and the outer peripheral wall has an annular slot 511. The inner annular wall thereof has a plurality of ribs 52 which are connected to a flow guide 53. A plurality of through holes 54 are formed by the flow guide 53 and the ribs 52. Each of the axial center of the rib is installed with a central hold 531 which is communicated with the annular slot 511. The center of the bottom of each rib 52 is formed with a guide hole 521 which is communicated to the central hole 531 of each rib 52. The opening at the lower end of the central hole 531 is installed with a mold 55.

The dispatching tube 6 is connected to the distal end of the secondary tube 4 and is connected to the annular slot 511 of the flow dividing mold 5.

The mixing tube 7 has an upper end connected to the lower end of the secondary tube 4 and is connected to the annular slot 511 of the flow dividing mold 5.

By the aforesaid construction, according to the following steps, a pattern-through soap is formed by the soap body 1 and the pattern block 2.

(A) First Process

Figure 6:
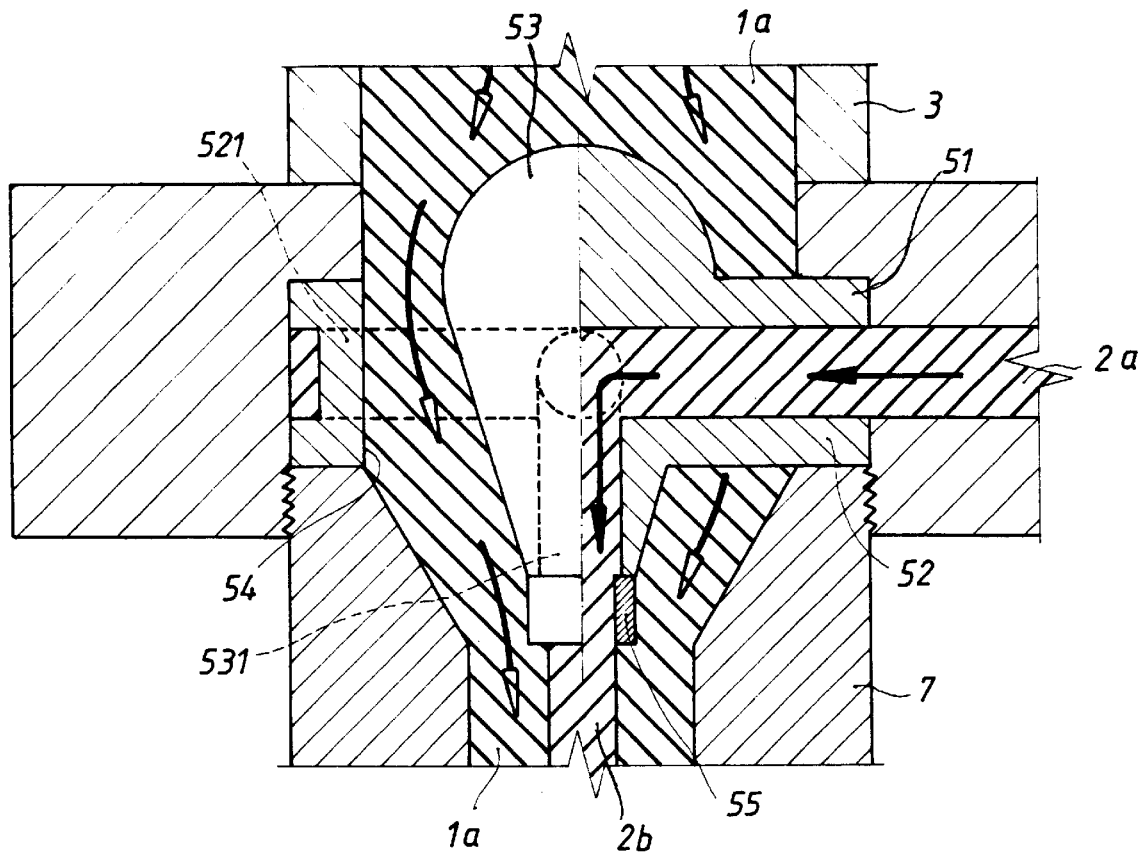
FIG. 6 is a schematic view showing the flows of the soap materials in the flow dividing mold, wherein the soap materials are squeezed in the primary tube and secondary tube.

Two soap material so of different colors are selected at first. The materials are filled into the primary tube 3 and the secondary tube 4 from the inlets 31 and 41 of the soap shaping machine. The materials are melted by heating through the primary tube 3 and secondary tube 4. The mixed soap materials 1a and 2a are squeezed through the feeding stud in the primary tube 3 and secondary tube 4. The soap material 2a squeezed in the secondary tube 4 flows to annular slot 511 of the flow dividing mold 5 by the dispatching tube 6 (see FIG. 6). Then, the material is guided to the central hole 531 from each guide hole 521. Then it is squeezed to acquire a desired shape by the mold 55 at the lower opening of the central hole 531. The soap material 2a is shaped to be a strip pattern soap material 2b which has a strip shape identical to that engraved on the mold 55.

In the aforesaid process, the two colors of the soap materials 1a, 2a are adapted with clear contrast colors for appearing the pattern block 2 embedded in the soap body 1.

(B) Second Process

Figure 7:
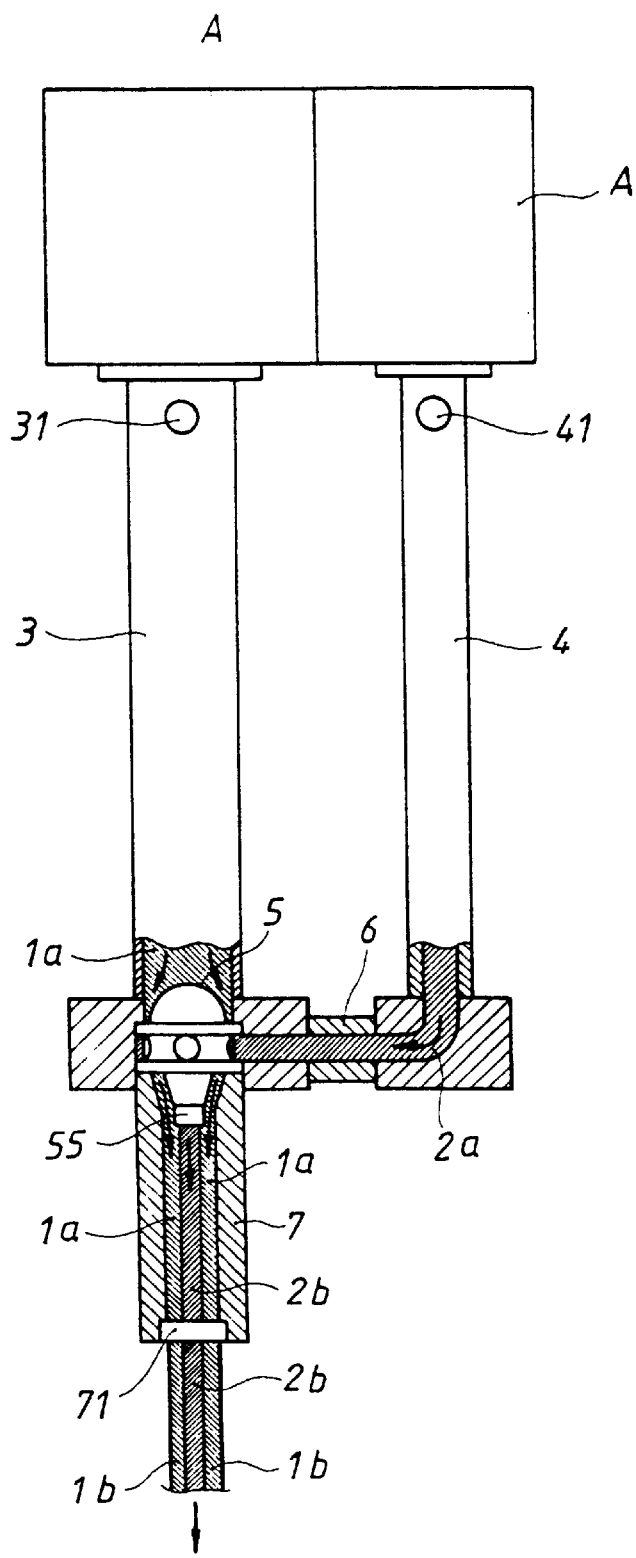
FIG. 7 is a schematic view showing the flow of the soap material in the present invention.

Following the said steps, the soap material 1a squeezed in the primary tube 3 is guided to the through hole 54 through the flow guide 53 of the flow dividing mold 5 and then flows to enclose the patterned soap material 2b. Then, both soap materials are squeezed downwards to the shaping mold 71 at the lower end of the mixing tube 7. Thus, a strip shape soap material 1b having a shape identical to the pattern on the soap material 71 is formed (see FIG. 7).

In the aforesaid process, in order to avoid that the patterned soap material 2b is melt as it is enclosed by the soap material 1a, as the patterned soap material 2b is run out of the mold 55, it is cooled properly so that the surface hardness of the patterned soap material 2b can suffer from the high temperature squeezing of the soap material 1a without deformation or generating melted edges. Thus, the outlook of the patterned soap material 2b is retained to have a complete shape.

(C) Third Process

The strip shaped soap materials 1b with the patterned soap material 2b therein is cut according to the product of the soap, then pattern-through soap according to the present invention is produced.

In the pattern-through soap manufactured according to the aforesaid processes, the pattern of the pattern block 2 can be seen on the two faces of the soap. The mold 55 and the shaping mold 71 can be interchanged for providing the manufacturer to make soaps having different patterns and different shapes. After the soap is used for a long time, the pattern on the pattern block 2 remains to be clear, even the soap is thin. Thus, the user has a deep impression for stimulating the user to buy this product again.

Further, the product of the soap from the third process has tip corners. Thus, a special mold can be used to punch the soap so that the surface of the soap has a proper cambered shape and the corners have a round shape.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for manufacturing a pattern-through soap in a soap shaping machine comprising a primary tube (3) and a secondary tube (4), a distal end of the primary tube (3) assembled with a flow dividing mold (5), and a distal end of the secondary tube (4) connected with a dispatching tube (6); a distal end of the flow dividing mold (5) is connected with a mixing tube (7); the method comprising the steps of selecting two soap materials (1a, 2a) of different clearly contrasting colors, the material of the first color is filled into a primary tube (3) and material of a second contrasting color into the secondary tube (4), the materials are melted by heating through the primary tube (3) and secondary tube (4); the mixed soap materials (1a, 2a) are squeezed through a feeding stud in the primary tube (3) and the secondary tube (4); the soap material (2a) squeezed in the secondary tube (4) flows to the flow dividing mold (5) by the dispatching tube (6); wherein the flow dividing mold (5) comprises an annular ring (51) with an outer peripheral wall having an annular slot (511); the inner annular wall thereof having a plurality of ribs (52) which are connected to a flow guide (53); a plurality of through holes (54) are formed by the flow guide (53) and the ribs (52); each axial center of the rib contains a guide hole (521) which communicates with the annular slot (511); the center of a bottom of each rib (52) is formed with a central hole (531) which communicates to the guide hold (521) of each rib (52); an opening at the lower end of the central hole (531) is attached to a mold (55); the soap material is squeezed to flow in an annular direction around the annular slot and through the guide hole to the central hole to the mold (55) to acquire a desired shape by the mold (55) at the lower opening; the soap material (2a) is shaped to a strip pattern soap material (2b) which has a strip shape identical to that engraved on the mold; squeezing the soap material (1a) in the primary tube (3) to flow through the flow dividing mold (5) through holes (54) to enclose the pattern shape material (2b); squeezing both soap materials downward to a shaping mold (71) at a lower end of mixing tube (7); thus a strip shape soap material (1b) having a shape identical to the pattern of the soap material (71) is formed;

and cutting the shaped soap materials (1b) with the pattern soap material (2b) therein.

2. The process according to claim 1 further comprising cooling the pattern soap material (2b) which comes from the mold (55) to provide a surface hardness of the pattern soap material without deformation or generating melted edges.

3. The method of claim 1 wherein the soap has tip corners and a special mold is used and the soap shaped by the mold so that the surface of the soap has a proper cambered shape and the corners have a rounded shape.

* * * * *